(12) United States Patent
Nukushina (10) Patent No.: US 12,344,039 B2
(45) Date of Patent: Jul. 1, 2025

(54) PNEUMATIC TIRE

(71) Applicant: The Yokohama Rubber Co., LTD., Tokyo (JP)

(72) Inventor: Ryosuke Nukushina, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 835 days.

(21) Appl. No.: 16/325,703

(22) PCT Filed: Jul. 13, 2017

(86) PCT No.: PCT/JP2017/025620
§ 371 (c)(1),
(2) Date: Jan. 24, 2022

(87) PCT Pub. No.: WO2018/034088
PCT Pub. Date: Feb. 22, 2018

(65) Prior Publication Data
US 2022/0219491 A1    Jul. 14, 2022

(30) Foreign Application Priority Data
Aug. 19, 2016 (JP) .................... 2016-161262

(51) Int. Cl.
*B60C 11/03* (2006.01)

(52) U.S. Cl.
CPC ... *B60C 11/0302* (2013.01); *B60C 2011/0346* (2013.01); *B60C 2011/0353* (2013.01);
(Continued)

(58) Field of Classification Search
CPC .................... B60C 11/24; B60C 2011/0346
See application file for complete search history.

(56) References Cited

U.S. PATENT DOCUMENTS 4,641,696 A * 2/1987 Semin ................. B60C 11/0302
  152/209.28
5,439,040 A * 8/1995 Iwamura ............. B60C 11/1369
  152/903
(Continued)

FOREIGN PATENT DOCUMENTS

EP   2 163 405    3/2010
EP   2 583 840    4/2013
(Continued)

OTHER PUBLICATIONS

International Search Report for International Application No. PCT/JP2017/025620 dated Sep. 19, 2017, 4 pages, Japan.
(Continued)

*Primary Examiner* — Cedrick S Williams
(74) *Attorney, Agent, or Firm* — Thorpe North & Western (57) ABSTRACT

A pneumatic tire includes: a center main groove extending in a tire circumferential direction; a center land portion defined by the center main groove; a second land portion adjacent to the center land portion across the center main groove; and a second lug groove extending from the center main groove toward the second land portion in a tire lateral direction and defining the second land portion together with the center main groove; the center main groove including a center side edge portion corresponding to an edge portion on the center land portion side, the center side edge portion including a bent portion formed bent in a direction outwards in a groove width direction of the center main groove with an acute bend angle; and the second lug groove including an opening portion to the center main groove connected to the center main groove at a position opposing the bent portion.

17 Claims, 8 Drawing Sheets

(52) U.S. Cl.
CPC .......... *B60C 2011/0355* (2013.01); *B60C 2011/0358* (2013.01); *B60C 2011/0383* (2013.01)

(56) References Cited

U.S. PATENT DOCUMENTS

| | | | |
|---|---|---|---|
| 2006/0213593 A1* | 9/2006 | O'Brien | B60C 11/24 |
| | | | 156/110.1 |
| 2010/0078105 A1* | 4/2010 | Hashimoto | B60C 11/12 |
| | | | 152/209.18 |
| 2010/0116392 A1 | 5/2010 | Yamakawa | |
| 2013/0105051 A1 | 5/2013 | Takahashi | |
| 2014/0014246 A1 | 1/2014 | Fujita | |
| 2015/0020940 A1 | 1/2015 | Yasunaga | |
| 2016/0144666 A1 | 5/2016 | Yoshida | |
| 2017/0120691 A1* | 5/2017 | Arai | B60C 11/0306 |
| 2018/0009270 A1 | 1/2018 | Nishino | |

FOREIGN PATENT DOCUMENTS

| | | | |
|---|---|---|---|
| JP | 60169304 A * | 9/1985 | B60C 11/06 |
| JP | H01-297304 | 11/1989 | |
| JP | H04-271905 | 9/1992 | |
| JP | 2003-211920 | 7/2003 | |
| JP | 2009-120055 | 6/2009 | |
| JP | 2013-091479 | 5/2013 | |
| JP | 2015-020442 | 2/2015 | |
| JP | 2015-020465 | 2/2015 | |
| JP | 5770834 | 8/2015 | |
| JP | 2015-229461 | 12/2015 | |
| JP | 2016-132440 | 7/2016 | |
| WO | WO 2008/152996 | 12/2008 | |
| WO | WO 2012/133334 | 10/2012 | |
| WO | WO 2015/008659 | 1/2015 | |
| WO | WO 2015/186481 | 12/2015 | |
| WO | WO 2016/117696 | 7/2016 | |

OTHER PUBLICATIONS

European Office Action for European Application No. 17841316.7 dated Jan. 22, 2020, 15 pages, Germany.

* cited by examiner

| | CONVENTIONAL EXAMPLE | EXAMPLE 1 | EXAMPLE 2 | EXAMPLE 3 | EXAMPLE 4 |
|---|---|---|---|---|---|
| SECOND LUG GROOVE OPENS TO BENT PORTION OF CENTER MAIN GROOVE | NO | YES | YES | YES | YES |
| BEND ANGLE θ OF BENT PORTION (°) | 0 | 35 | 90 | 65 | 65 |
| GROOVE DEPTH OF CENTER MAIN GROOVE RELATIVE TO GROOVE DEPTH OF SECOND MAIN GROOVE (%) | 60 | 60 | 60 | 20 | 110 |
| GROOVE WIDTH OF CENTER MAIN GROOVE (mm) | 5.0 | 5.0 | 5.0 | 5.0 | 5.0 |
| ARRANGEMENT OF THREE-DIRECTION INTERSECTION POINTS AND FOUR-DIRECTION INTERSECTION POINTS | ONLY THREE-DIRECTION INTERSECTION POINTS | ONLY THREE-DIRECTION INTERSECTION POINTS | ONLY THREE-DIRECTION INTERSECTION POINTS | ONLY THREE-DIRECTION INTERSECTION POINTS | ONLY THREE-DIRECTION INTERSECTION POINTS |
| CIRCUMFERENTIAL NARROW GROOVE OF SECOND LAND PORTION | NO | NO | NO | NO | NO |
| LENGTH OF CIRCUMFERENTIAL NARROW GROOVE RELATIVE TO ENTIRE LENGTH OF SECOND LAND PORTION (%) | - | - | - | - | - |
| CONFIGURATION OF GROOVE WIDTH OF CIRCUMFERENTIAL NARROW GROOVE | - | - | - | - | - |
| EDGE OF SECOND LUG GROOVE OFFSET? | NO | NO | NO | NO | NO |
| BRAKING ON SNOW (BRAKING DISTANCE/INDEX VALUE) | 100 | 110 | 105 | 105 | 108 |
| STEERING STABILITY ON SNOW (FEELING/INDEX VALUE) | 100 | 110 | 105 | 105 | 110 |
| STEERING STABILITY ON ICE (FEELING/INDEX VALUE) | 100 | 103 | 101 | 103 | 103 |

FIG. 7A

|  | EXAMPLE 5 | EXAMPLE 6 | EXAMPLE 7 | EXAMPLE 8 | EXAMPLE 9 |
|---|---|---|---|---|---|
| SECOND LUG GROOVE OPENS TO BENT PORTION OF CENTER MAIN GROOVE | YES | YES | YES | YES | YES |
| BEND ANGLE θ OF BENT PORTION (°) | 65 | 65 | 65 | 65 | 65 |
| GROOVE DEPTH OF CENTER MAIN GROOVE RELATIVE TO GROOVE DEPTH OF SECOND MAIN GROOVE (%) | 60 | 60 | 60 | 60 | 60 |
| GROOVE WIDTH OF CENTER MAIN GROOVE (mm) | 2.5 | 11.0 | 5.0 | 5.0 | 5.0 |
| ARRANGEMENT OF THREE-DIRECTION INTERSECTION POINTS AND FOUR-DIRECTION INTERSECTION POINTS | ONLY THREE-DIRECTION INTERSECTION POINTS | ONLY THREE-DIRECTION INTERSECTION POINTS | ONLY THREE-DIRECTION INTERSECTION POINTS | ALTERNATELY DISPOSED | ALTERNATELY DISPOSED |
| CIRCUMFERENTIAL NARROW GROOVE OF SECOND LAND PORTION | NO | NO | NO | NO | YES |
| LENGTH OF CIRCUMFERENTIAL NARROW GROOVE RELATIVE TO ENTIRE LENGTH OF SECOND LAND PORTION (%) | - | - | - | - | 45 |
| CONFIGURATION OF GROOVE WIDTH OF CIRCUMFERENTIAL NARROW GROOVE | - | - | - | - | CONSTANT |
| EDGE OF SECOND LUG GROOVE OFFSET? | NO | NO | NO | NO | NO |
| BRAKING ON SNOW (BRAKING DISTANCE/INDEX VALUE) | 103 | 115 | 115 | 120 | 120 |
| STEERING STABILITY ON SNOW (FEELING/INDEX VALUE) | 103 | 110 | 110 | 115 | 120 |
| STEERING STABILITY ON ICE (FEELING/INDEX VALUE) | 105 | 103 | 103 | 105 | 105 |

FIG. 7B

|  | EXAMPLE 10 | EXAMPLE 11 | EXAMPLE 12 | EXAMPLE 13 |
|---|---|---|---|---|
| SECOND LUG GROOVE OPENS TO BENT PORTION OF CENTER MAIN GROOVE | YES | YES | YES | YES |
| BEND ANGLE θ OF BENT PORTION (°) | 65 | 65 | 65 | 65 |
| GROOVE DEPTH OF CENTER MAIN GROOVE RELATIVE TO GROOVE DEPTH OF SECOND MAIN GROOVE (%) | 60 | 60 | 60 | 60 |
| GROOVE WIDTH OF CENTER MAIN GROOVE (mm) | 5.0 | 5.0 | 5.0 | 5.0 |
| ARRANGEMENT OF THREE-DIRECTION INTERSECTION POINTS AND FOUR-DIRECTION INTERSECTION POINTS | ALTERNATELY DISPOSED | ALTERNATELY DISPOSED | ALTERNATELY DISPOSED | ALTERNATELY DISPOSED |
| CIRCUMFERENTIAL NARROW GROOVE OF SECOND LAND PORTION | YES | YES | YES | YES |
| LENGTH OF CIRCUMFERENTIAL NARROW GROOVE RELATIVE TO ENTIRE LENGTH OF SECOND LAND PORTION (%) | 95 | 70 | 70 | 70 |
| CONFIGURATION OF GROOVE WIDTH OF CIRCUMFERENTIAL NARROW GROOVE | CONSTANT | CONSTANT | WIDER OPENING PORTION SIDE | WIDER OPENING PORTION SIDE |
| EDGE OF SECOND LUG GROOVE OFFSET? | NO | NO | NO | YES |
| BRAKING ON SNOW (BRAKING DISTANCE/INDEX VALUE) | 110 | 120 | 122 | 125 |
| STEERING STABILITY ON SNOW (FEELING/INDEX VALUE) | 112 | 120 | 120 | 120 |
| STEERING STABILITY ON ICE (FEELING/INDEX VALUE) | 103 | 105 | 105 | 105 |

FIG. 7C

PNEUMATIC TIRE

TECHNICAL FIELD

The present technology relates to a pneumatic tire.

BACKGROUND ART

Studless tires are required to have good running performance on ice and snow. To increase the adhesive friction force, a flexible rubber is used in the studless tire, and to increase performance on ice and snow, a groove formed in a tread portion has a special configuration. For example, the pneumatic tire described in Japan Unexamined Patent Publication No. 2015-20465 is designed to have improved performance on icy roads, steering stability performance, and wear resistance performance in a well-balanced manner. The pneumatic tire includes a center land portion defined by a pair of center main grooves, a central narrow groove extending in a zigzag-manner in the tire circumferential direction on a tire equator line on the center land portion, and center lug grooves extending from the center main grooves to the zigzag vertices of the central narrow groove.

In addition, the pneumatic tire described in Japan Patent No. 5770834 is designed to have improved traction performance and steering stability on snow-covered road surfaces. The pneumatic tire includes edge land portion rows formed outward of two circumferential main grooves in the tire lateral direction, main lug grooves formed in the edge land portion rows inclined with respect to the tire lateral direction, and a first auxiliary groove inclined in the opposite direction to the main lug grooves, the first auxiliary groove extending across a central land portion row located between the two circumferential main grooves and the edge land portion row. The pneumatic tire described in Japan Unexamined Patent Publication No. 2015-229461 is designed to have enhanced performance on ice and performance on snow in a well-balanced manner. The pneumatic tire includes, in a tread portion, three small grooves that meet with the center lines offset from one another and a triangular portion defined by the center lines of the small grooves formed in the portion where the small grooves meet.

In recent years, in the development of studless tires, importance has increasingly been placed on obtaining performance on snow and steering stability on snow and ice in a compatible manner. In particular, in terms of the steering stability, the demand of improvements in braking ability and turnability on snow and ice has increased. Generally, decreasing the groove area of the tread pattern is an effective way of improving the steering stability. However, increasing the groove area is an effective way of improving performance on snow. Thus, it is very difficult to achieve both performances in a compatible manner.

SUMMARY

The present technology provides a pneumatic tire that can achieve performance on snow and steering stability in a compatible manner.

A pneumatic tire according to an embodiment of the present technology includes:
- a first main groove extending in a tire circumferential direction;
- a first land portion defined by the first main groove;
- a second land portion located adjacent to the first land portion across the first main groove; and
- a second land portion lug groove extending from the first main groove toward the second land portion in a tire lateral direction and defining the second land portion together with the first main groove;
- the first main groove including a first land portion side edge portion corresponding to an edge portion on the first land portion side, the first land portion side edge portion including a bent portion formed bent in a direction outwards in a groove width direction of the first main groove with an acute bend angle $\theta$; and
- the second land portion lug groove including an opening portion to the first main groove connected to the first main groove at a position opposing the bent portion.

In the pneumatic tire described above, preferably the bend angle $\theta$ of the bent portion is within a range of $40° \leq \theta \leq 85°$.

In the pneumatic tire described above, preferably a groove depth Ds of the first main groove and a groove depth Dg of a wear detection main groove extending in the tire circumferential direction and including a tread wear indicator have a relationship within a range of $0.25 Dg \leq Ds \leq Dg$.

In the pneumatic tire described above, preferably a groove width W of the first main groove is within a range of $3 \text{ mm} \leq W \leq 10 \text{ mm}$.

In the pneumatic tire described above, preferably
- a first land portion lug groove is connected to the first main groove and extends inwards from the first main groove in the tire lateral direction;
- a plurality of the second land portion lug grooves are provided, and at least one of the plurality of second land portion lug grooves includes an opening portion to the first main groove connected at a position that at least partially overlaps in the tire circumferential direction with an opening portion of the first land portion lug groove to the first main groove;
- the plurality of second land portion lug grooves are connected to the first main groove at a plurality of intersection points; and
- the plurality of intersection points include a three-direction intersection point where the bent portion is formed on the first land portion side edge portion side of the first main groove, and a four-direction intersection point where the first land portion lug groove is connected to the first main groove on the first land portion side edge portion side, the three-direction intersection point and the four-direction intersection point being alternately disposed in the tire circumferential direction.

In the pneumatic tire described above, preferably the second land portion is provided with a circumferential narrow groove extending in the tire circumferential direction, the circumferential narrow groove including an end connected to the second land portion lug groove and an end terminating within the second land portion.

In the pneumatic tire described above, preferably the circumferential narrow groove has a length in the tire circumferential direction ranging from 50% to 90% of an entire length of the second land portion in the tire circumferential direction.

In the pneumatic tire described above, preferably the circumferential narrow groove has a wider groove width at an end portion on a side connected to the second land portion lug groove than at an end portion on a side where the circumferential narrow groove terminates within the second land portion.

In the pneumatic tire described above, preferably the second land portion lug groove includes an edge on a side where the circumferential narrow groove is connected, the edge is offset in a groove width direction of the second land portion lug groove at either side in the tire lateral direction of a position where the circumferential narrow groove is connected.

A pneumatic tire according to an embodiment of the present technology can achieve the effects of providing performance on snow and steering stability in a compatible manner.

DETAILED DESCRIPTION

Pneumatic tires according to embodiments of the present technology are described in detail below with reference to the drawings. However, the technology is not limited to these embodiments. Constituents of the following embodiments include elements that are essentially identical or that can be substituted or easily conceived by one skilled in the art.

Herein, "tire lateral direction" refers to the direction that is parallel with a rotation axis of a pneumatic tire. "Inward in the tire lateral direction" refers to the direction toward the tire equator line in the tire lateral direction. "Outward in the tire lateral direction" refers to the direction opposite the direction toward the tire equator line in the tire lateral direction. "Tire radial direction" refers to the direction orthogonal to the tire rotation axis. "Tire circumferential direction" refers to the direction of rotation about the tire rotation axis.

Figure 1:
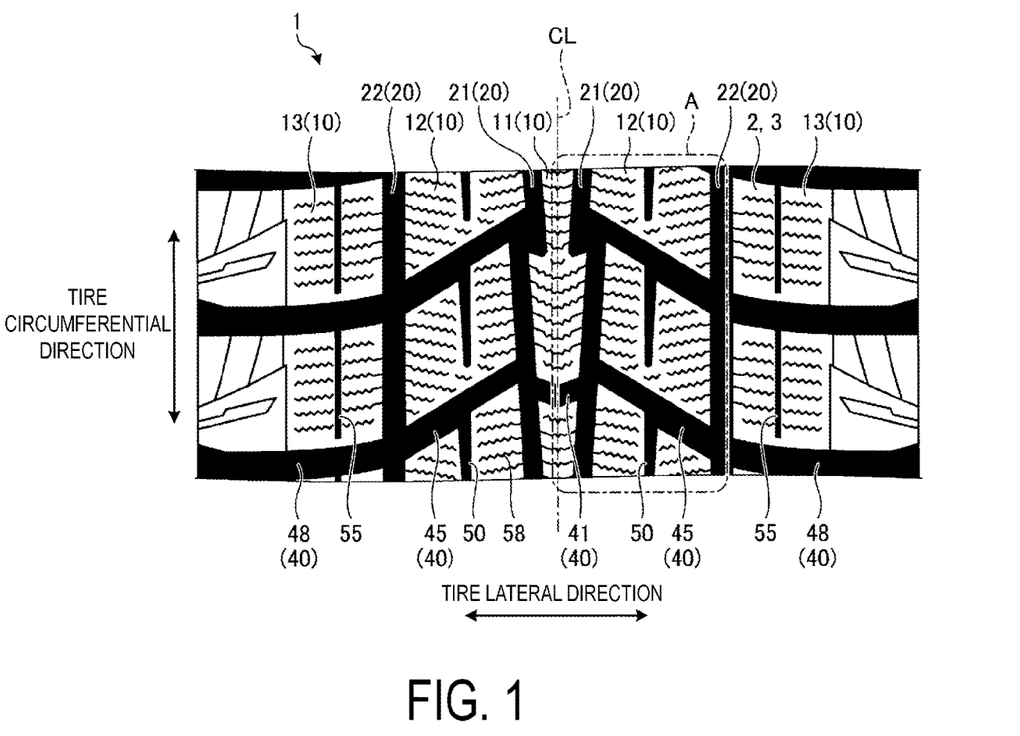
FIG. 1 is a plan view illustrating a tread surface of a pneumatic tire according to an embodiment.

FIG. 1 is a plan view of a tread surface of a pneumatic tire according to an embodiment. The pneumatic tire 1 illustrated in FIG. 1 is provided with a tread portion 2 in the outermost portion in the tire radial direction. The surface of the tread portion 2, i.e., the portion that comes into contact with the road surface when a vehicle (not illustrated) mounted with the pneumatic tire 1 travels, is formed as a tread surface 3. A plurality of circumferential main grooves 20 extending in the tire circumferential direction and a plurality of lug grooves 40 extending in the tire lateral direction are formed in the tread surface 3. A plurality of land portions 10 defined by the circumferential main grooves 20 and the lug grooves 40 are formed in the tread surface 3.

Specifically, four circumferential main grooves 20 are formed side by side in the tire lateral direction. The four circumferential main grooves 20 include two center main grooves 21 located on either side of a tire equator line CL in the tire lateral direction and two second main grooves 22 located outward of the two center main grooves 21 in the tire lateral direction. The lug grooves 40 include center lug grooves 41 located between the two center main grooves 21, second lug grooves 45 located between an adjacent center main groove 21 and second main groove 22, and shoulder lug grooves 48 located outward of the second main grooves 22 in the tire lateral direction. The circumferential main grooves 20 herein have a groove width ranging from 3.0 mm to 10.0 mm and a groove depth ranging from 8.0 mm to 9.5 mm. Moreover, the lug grooves 40 have a groove width ranging from 1.5 mm to 8.0 mm and a groove depth ranging from 5.0 mm to 9.0 mm.

Figure 2:
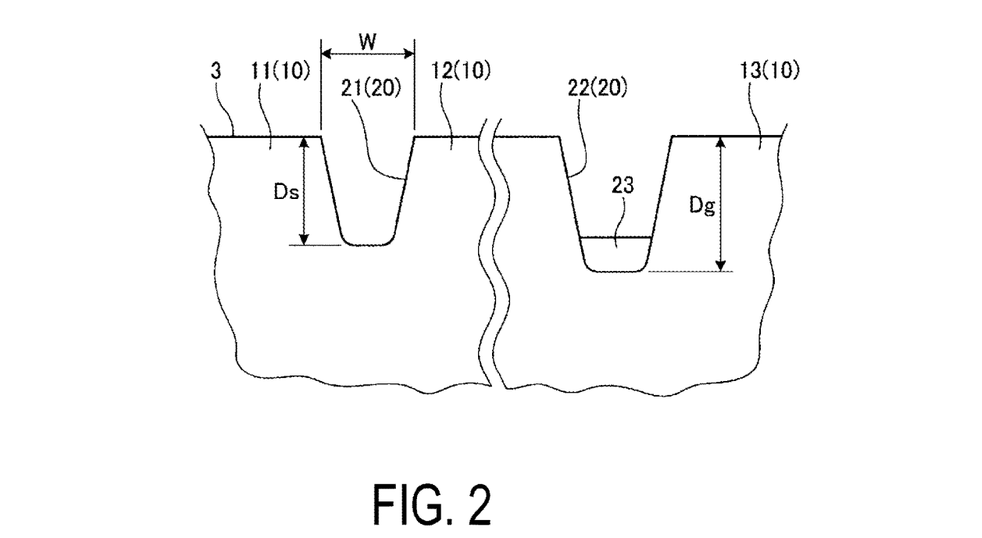
FIG. 2 is a cross-sectional view of a center main groove and a second main groove illustrated in FIG. 1.

FIG. 2 is a cross-sectional view of a center main groove and a second main groove illustrated in FIG. 1. Of the plurality of circumferential main grooves 20, the center main grooves 21 are provided as first main grooves, and the second main grooves 22 are provided as wear detection main grooves provided with a tread wear indicator 23 indicating the terminal stages of wear. The tread wear indicator 23 has a short length in the tire lateral direction and is formed projecting from the groove bottom of the second main groove 22. The tread wear indicator 23 is provided at a plurality of sections around the tire circumference of the second main groove 22. A groove depth Ds of the center main groove 21 and a groove depth Dg of the second main groove 22 including the tread wear indicator 23 have a relationship within the range of $0.25Dg \le Ds \le Dg$. Note that the groove depth Dg of the second main groove 22 is the depth at a position without the tread wear indicator 23, and preferably the relationship is within the range of $0.50Dg \le Ds \le Dg$.

In addition, the center main groove 21 has a groove width W within the range $3\ mm \le W \le 10\ mm$. Preferably, the groove width W of the center main groove 21 is within the range of $3.5\ mm \le W \le 7.0\ mm$.

Of the plurality of lug grooves 40, the center lug grooves 41 are provided as first land portion lug grooves that define a center land portion 11. The center lug grooves 41 extending in the tire lateral direction are formed between the two center main grooves 21 and are connected to the center main grooves 21 at both ends. The second lug grooves 45 are formed between an adjacent center main groove 21 and second main groove 22 and extending in the tire lateral direction. The second lug grooves 45 each include an end connected to the center main groove 21 and an end connected to the second main groove 22. That is, the second lug grooves 45 are provided as second land portion lug grooves that define second land portions 12 and extend from the center main groove 21 toward the second land portion 12 in the tire lateral direction. The shoulder lug grooves 48 are formed at a position outward of the second main grooves 22 in the tire lateral direction and extend in the tire lateral direction. The shoulder lug grooves 48 each include an inner end portion in the tire lateral direction connected to the second main groove 22. Moreover, these lug grooves 40 extend in the tire lateral direction and are inclined or curved in the tire circumferential direction. The configuration of the lug grooves 40 inclined or curved in the tire circumferential direction with respect to the tire lateral direction is set as appropriate depending on the target tread pattern.

The land portions 10 are defined by the circumferential main grooves 20 and the lug grooves 40 and include the center land portion 11, i.e., first land portion, located between the two center main grooves 21, the second land portions 12, i.e., second land portions, located between an adjacent center main groove 21 and second main groove 22, and shoulder land portions 13, i.e., third land portions, located outward of the second main grooves 22 in the tire lateral direction. Of these, the center land portion 11 is located on the tire equator line CL and is defined by the center main grooves 21 and the center lug grooves 41. The second land portions 12 are formed adjacent to the center land portion 11 across the center main grooves 21 and are defined by the center main grooves 21, the second main grooves 22, and the second lug grooves 45. The shoulder land portions 13 are formed adjacent to the second land portions 12 across the second main grooves 22 and are defined by the second main grooves 22 and the shoulder lug grooves 48. A shoulder narrow groove 55 is formed in each shoulder land portion 13 extending in the tire circumferential direction. The shoulder narrow groove 55 includes an end connected to the shoulder lug groove 48 and an end that terminates within the shoulder land portion 13. In this manner, the center land portion 11, the second land portions 12, and the shoulder land portions 13 are defined by the circumferential main grooves 20 and the lug grooves 40, forming blocks.

A plurality of sipes 58 are formed in the tread surface 3. The sipes 58 are formed in each land portion 10, i.e., the center land portion 11, the second land portions 12, and the shoulder land portions 13. The sipes 58 have a zigzag shape that extends in the tire lateral direction oscillating in the tire circumferential direction.

Note that the sipe 58 herein refers to a narrow groove formed in the tread surface 3 with a configuration such that when the pneumatic tire 1 is mounted on a regular rim, adjusted to regular internal pressure conditions, and is in an unloaded state, the wall surfaces of the narrow groove do not come into contact, however, when the pneumatic tire 1 is placed on a flat plate and loaded in the vertical direction with the narrow groove located at the contact patch formed on the flat plate or when the land portion including the narrow groove flexes, the wall surfaces of the narrow groove or at least a portion on the wall surfaces are brought into contact with one another by the deformation of the land portion. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. In the present embodiment, the sipes 58 have a width ranging from 0.6 mm to 1.0 mm and a depth ranging from 6.0 mm to 8.0 mm.

Figure 3:
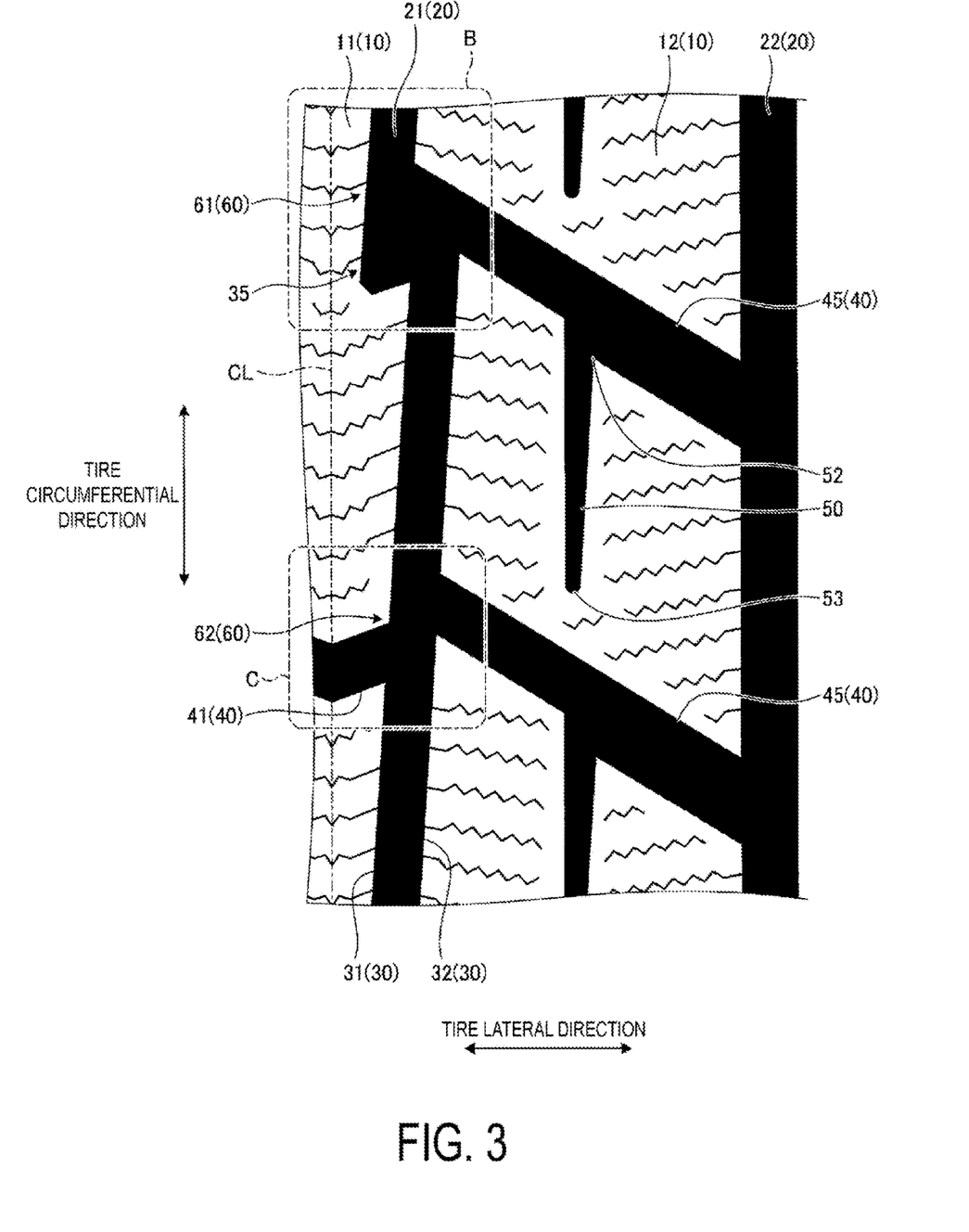
FIG. 3 is a detailed view of portion A of FIG. 1.

FIG. 3 is a detailed view of portion A of FIG. 1. The center main groove 21 includes a center side edge portion 31, i.e., first land portion side edge portion, which is an edge portion 30 on the center land portion 11 side. The center side edge portion 31 includes a bent portion 35 formed where the center side edge portion 31 bends. Specifically, the center main groove 21 is formed with its position shifted in the tire lateral direction an amount equal to the groove width of the center main groove 21 at a predetermined plurality of positions in the tire circumferential direction. That is, the center main groove 21 is formed extending in the tire circumferential direction and in a direction in the tire lateral direction, meaning that the center main groove 21 is inclined with respect to the tire circumferential direction. Thus, at a predetermined plurality of positions in the tire circumferential direction, the position of the center main groove 21 in the tire lateral direction is shifted in the opposite direction to the inclination direction of the center main groove 21. As such, the center main groove 21 overall is formed with its position in the tire lateral direction within a predetermined range. In other words, the center main groove 21 extends in the tire circumferential direction and is formed in a zigzag shape that oscillates in the tire lateral direction.

Because the center main groove 21 is shifted in the tire lateral direction at a plurality of positions in this way, the center side edge portion 31 and a second side edge portion 32, which is the edge portion 30 of the center main groove 21 on the second land portion 12 side, are offset from one another in the same tire lateral direction at the position in the tire circumferential direction where the center main groove 21 is shifted in the tire lateral direction. By the center side edge portion 31 bending in the tire lateral direction at a position in the tire circumferential direction where the center side edge portion 31 is shifted in the tire lateral direction, the bent portion 35, formed in the center side edge portion 31, connects other center side edge portions 31 with different positions in the tire lateral direction.

Figure 4:
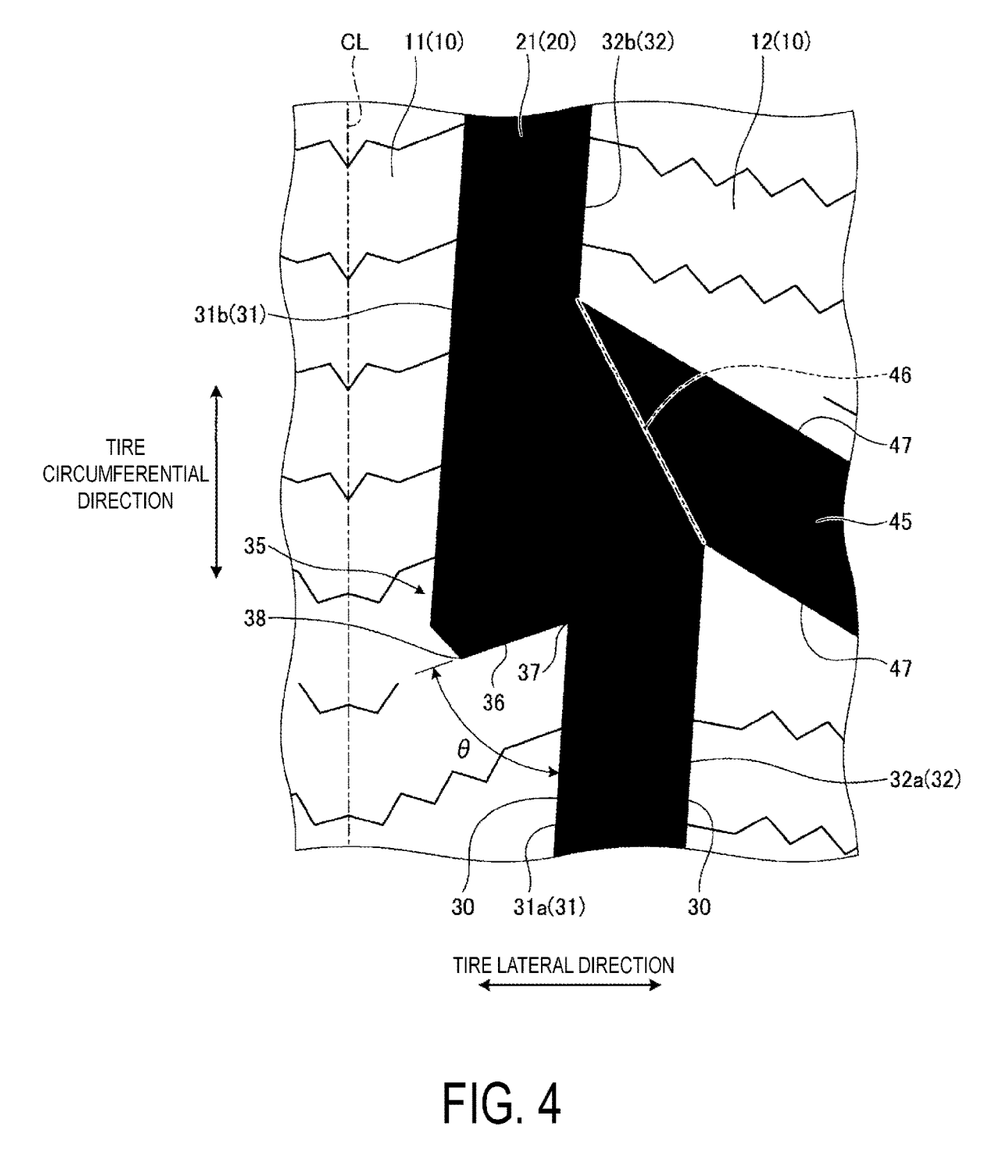
FIG. 4 is a detailed view of portion B of FIG. 3.

FIG. 4 is a detailed view of portion B of FIG. 3. At the bent portion 35 where the position in the tire lateral direction of the center side edge portion 31 differs, the center side edge portion 31 is formed with a bend in the direction outward with respect to the groove width direction of the center main groove 21. Specifically, by the position in the tire lateral direction of the center main groove 21 being shifted at a predetermined position in the tire circumferential direction, the position in the tire lateral direction of the center side edge portion 31 is also shifted. At the position where the position in the tire lateral direction of the center main groove 21 is shifted, the center side edge portion 31 includes a portion located on the center land portion 11 side and a portion located on the second land portion 12 side. In other words, the center side edge portion 31 includes an inner center side edge portion 31b and an outer center side edge portion 31a at the position where the position in the tire lateral direction of the center main groove 21 is shifted. The inner center side edge portion 31b is the portion located on the center land portion 11 side, and the outer center side edge portion 31a is the portion located on the second land portion 12 side. The outer center side edge portion 31a and the inner center side edge portion 31b are arranged such that the inner center side edge portion 31b is positioned further inwards in the tire lateral direction than the outer center side edge portion 31a at the position where the center side edge portion 31 is shifted in the tire lateral direction.

The bent portion 35 bends from the outer center side edge portion 31a of the center side edge portion 31 in the direction outward in the groove width direction of the center main groove 21. The portion of the center side edge portion 31 extending outwards in the groove width direction of the center main groove 21 corresponds to a bent portion edge portion 36. That is, the outer center side edge portion 31a and the inner center side edge portion 31b of the center side edge portion 31 are connected by the bent portion edge portion 36.

As the bent portion edge portion 36 formed in this way extends outwards in the groove width direction of the center main groove 21 from the outer center side edge portion 31a, i.e., toward the center land portion 11 side from the second land portion 12 side, the bent portion edge portion 36 is inclined in the tire circumferential direction with respect to the tire lateral direction toward the side in the tire circumferential direction where the outer center side edge portion 31a is located. In other words, the bent portion edge portion 36 includes an outer end portion 37, which is the end portion connected to the outer center side edge portion 31a, and an inner end portion 38, which is the end portion connected to the inner center side edge portion 31b, and the bent portion edge portion 36 is inclined such that the position in the tire circumferential direction of the inner end portion 38 is closer to the side where the outer center side edge portion 31a is located than the outer end portion 37. Thus, the bent portion edge portion 36 has a bend angle θ which is an acute angle and is formed bent relative to the outer center side edge portion 31a. That is, the bent portion 35 is formed so that the bend angle θ of the center side edge portion 31 is an acute angle. The bend angle θ of the bent portion 35 is preferably formed in the range of 40°≤θ≤85° and more preferably in the range of 60°≤θ≤75°.

At least one second lug groove 45 of the plurality of second lug grooves 45 extending outwards in the tire lateral direction from the center main groove 21 is connected to the center main groove 21 at a position at or near the bent portion 35, that is, an opening portion 46 of the second lug groove 45 to the center main groove 21 is connected to the center main groove 21 at a position opposing the bent portion 35. An intersection point 60 where the second lug groove 45 is connected to the center main groove 21 at a position at or near the bent portion 35 is formed as a three-direction intersection point 61 where grooves extend from the intersection point 60 in three directions including the two directions of the center main groove 21 and the one direction of the second lug groove 45.

To explain the configuration of the three-direction intersection point 61 with the second lug groove 45 connected to the center main groove 21, the center main groove 21 is shifted in the position in the tire lateral direction at a predetermined position in the tire circumferential direction. Thus, the position in the tire lateral direction of the second side edge portion 32 is also shifted, in a similar manner to the center side edge portion 31. Accordingly, the second side edge portion 32 includes an inner second side edge portion 32b and an outer second side edge portion 32a at the position where the position in the tire lateral direction of the center main groove 21 is shifted. The inner second side edge portion 32b is the portion located on the center land portion 11 side and the outer second side edge portion 32a is the portion located on the second land portion 12 side.

The second lug groove 45 connected to the center main groove 21 at the three-direction intersection point 61 is connected to the second side edge portion 32 at a position where the position of the center main groove 21 in the tire lateral direction is shifted. Thus, the second lug groove 45 is configured such that one of two edges 47 of the second lug groove 45 on both sides in the groove width direction is connected to the outer second side edge portion 32a and the other edge 47 is connected to the inner second side edge portion 32b. The positions in the tire lateral direction of the outer second side edge portion 32a and the inner second side edge portion 32b are different, thus the opening portion 46 of the second lug groove 45 to the center main groove 21, with the edges 47 on both sides in the groove width direction separately connected to the outer second side edge portion 32a and the inner second side edge portion 32b, is inclined with respect to the tire lateral direction. Accordingly, the opening portion 46 of the second lug groove 45 to the center main groove 21 is inclined towards the bent portion 35 formed on the center side edge portion 31 side of the center main grooves 21 and is formed at a position opposing the bent portion 35.

Note that the opening portion 46 of the second lug groove 45 with such a configuration refers to a region connecting an intersection point between one of the edges 47 of the second lug groove 45 and the outer second side edge portion 32a of the center main groove 21 with an intersection point between the other edge 47 of the second lug groove 45 and the inner second side edge portion 32b of the center main groove 21. Additionally, "the opening portion 46 of the second lug groove 45 with such a configuration opposing the bent portion 35" refers to a state in which at least a portion of the bent portion edge portion 36 of the bent portion 35 is located in the region orthogonal to the opening portion 46 in terms of the width of the opening portion 46.

Figure 5:
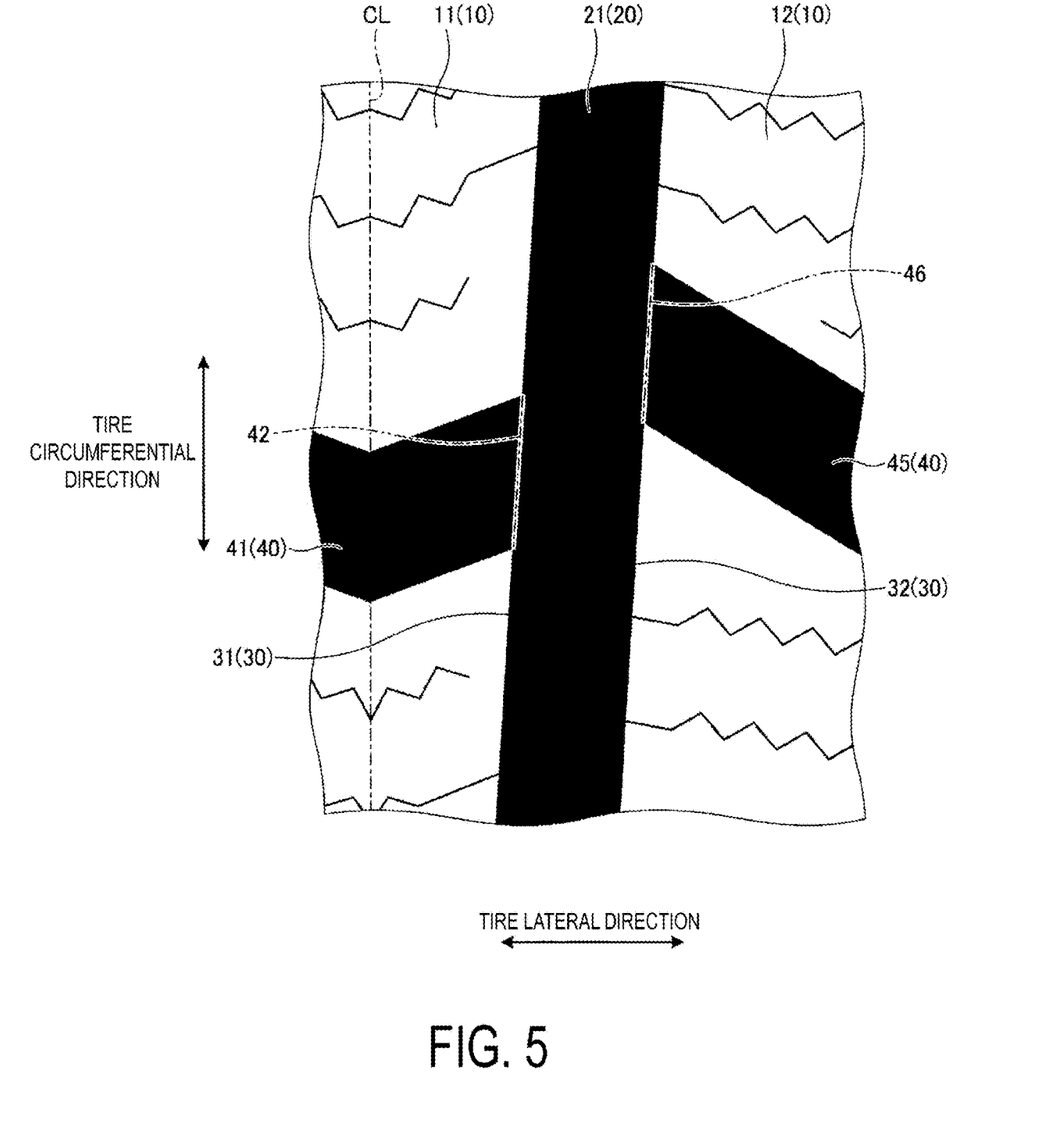
FIG. 5 is a detailed view of portion C of FIG. 3.

At least another one of the plurality of second lug grooves 45 is connected to the center main groove 21 at or near a portion where the center lug groove 41 extending from the center main groove 21 inwards in the tire lateral direction is connected to the center main groove 21. FIG. 5 is a detailed view of portion C of FIG. 3. The second lug groove 45, connected to the center main groove 21 at or near a portion where the center lug groove 41 is connected to the center main groove 21, is connected to the second side edge portion 32 of the center main groove 21, in a similar manner to the second lug groove 45 connected to the center main groove 21 at the three-direction intersection point 61. The intersection point 60, where the center lug groove 41 is connected to the center main groove 21 on the center side edge portion 31 side and where the second lug grooves 45 is connected to the center main groove 21 on the second side edge portion 32 side, is formed as a four-direction intersection point 62 where grooves extend from the intersection point 60 in four directions including the two directions of the center main groove 21 and the one direction each of the center lug groove 41 and of the second lug groove 45.

The opening portion 46 of the second lug groove 45 to the center main groove 21 connected to the center main groove 21 at the four-direction intersection point 62 and an opening portion 42 to the center main groove 21 of the center lug groove 41 are connected at positions that at least partially overlap in the tire circumferential direction. That is, the opening portion 46 of the second lug groove 45 to the center main groove 21 and the opening portion 42 of the center lug groove 41 to the center main groove 21, when viewed in the tire lateral direction, overlap at least partially and are at least partially opposed to one another.

A plurality of the four-direction intersection points 62 and the three-direction intersection points 61 formed in this manner are provided on the center main groove 21, with the plurality of four-direction intersection points 62 and the plurality of three-direction intersection points 61 being alternately disposed in the tire circumferential direction.

Figure 6:
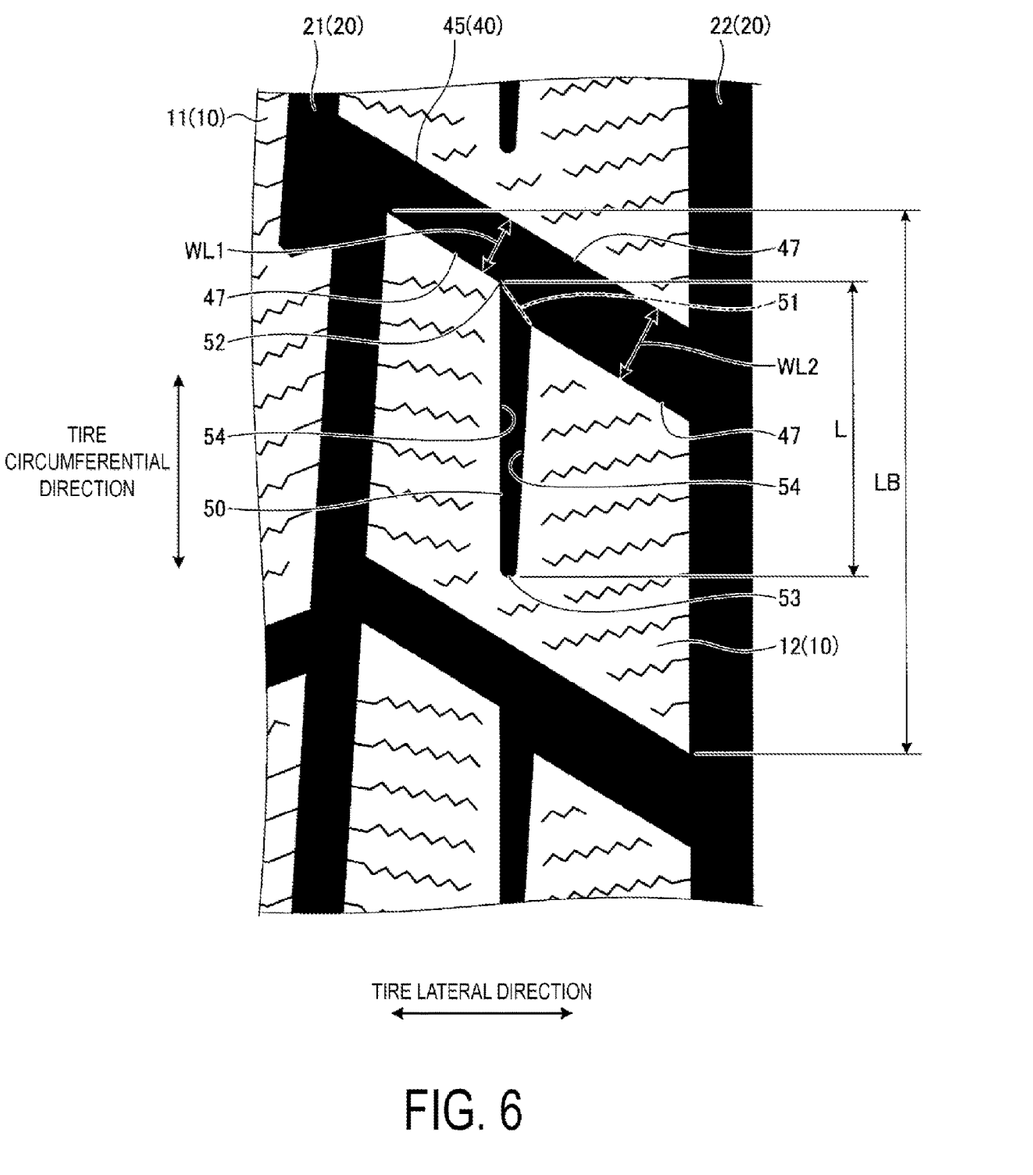
FIG. 6 is a detailed view of a second land portion illustrated in FIG. 3.

FIG. 6 is a detailed view of the second land portion illustrated in FIG. 3. The plurality of second lug grooves 45 formed between the center main groove 21 and the second main groove 22 extend in the tire lateral direction and are inclined in the tire circumferential direction. The inclination angle is the same for each second lug groove 45. Thus, the second land portion 12 is defined on both sides in the tire circumferential direction by the second lug grooves 45 and defined on both sides in the tire lateral direction by the center main groove 21 and the second main groove 22 and is formed in a generally parallelogram shape.

A circumferential narrow groove 50 is formed in the second land portion 12 formed in this manner. The circumferential narrow groove 50 extends in the tire circumferential direction and includes an end connected to the second lug groove 45 and an end that terminates within the second land portion 12. The circumferential narrow groove 50 is formed in or near a central region of the second land portion 12 in the tire lateral direction. The circumferential narrow groove 50 is connected to and extends in the tire circumferential direction from one of the second lug grooves 45 that define the second land portion 12 on both sides in the tire circumferential direction. Additionally, the circumferential narrow grooves 50 formed in the plurality of second land portions 12 are all connected to the second lug groove 45 located on the same side in the tire circumferential direction and extend from this second lug groove 45 into the second land portion 12.

In this way, the circumferential narrow groove 50 extending in the tire circumferential direction has a length L in the tire circumferential direction ranging from 50% to 90% of an entire length LB of the second land portion 12 in the tire circumferential direction. In other words, the relationship between the length L of the circumferential narrow groove 50 and the entire length LB of the second land portion 12 in the tire circumferential direction is in the range of $0.5 \leq (L/LB) \leq 0.9$. The length L of the circumferential narrow groove 50 with such a configuration is the distance in the tire circumferential direction from an end portion 53 of the circumferential narrow groove 50 on the side terminating within the second land portion 12 to a portion of an end portion 52 of the circumferential narrow groove 50 on the side connected to the second lug grooves 45 that is distanced furthest away in the tire circumferential direction from the end portion 53 on the side terminating within the second land portion 12. Additionally, the entire length LB of the second land portion 12 in the tire circumferential direction is the distance in the tire circumferential direction from one end portion of the second land portion 12 in the tire circumferential direction to the other end portion. Furthermore, the length L of the narrow groove 50 is preferably from 60% to 80% of the entire length LB of the second land portion 12.

The circumferential narrow groove 50 has a groove width that is wider at the end portion 52 on the side connected to the second lug groove 45 than at the end portion 53 on the side terminating within the second land portion 12. That is, the groove width of the circumferential narrow groove 50 gradually increases from the end portion 53 on the side terminating within the second land portion 12 to the end portion 52 on the side connected to the second lug groove 45, or the groove width gradually decreases from the end portion 52 on the side connected to the second lug groove 45 toward the end portion 53 on the side terminating within the second land portion 12. In other words, the circumferential narrow groove 50 has a tapered shape.

The edge 47 of the second lug groove 45 on the side where the circumferential narrow groove 50 is connected is offset in the groove width direction of the second lug groove 45 at either side in the tire lateral direction of the position where the circumferential narrow groove 50 is connected. Specifically, the edge 47 on the side where the circumferential narrow groove 50 is connected to the second lug groove 45 includes a portion located on the second main groove 22 side and a portion located on the center main groove 21 side relative to the position where the circumferential narrow groove 50 is connected in the tire lateral direction. The portion located on the second main groove 22 side is offset from the portion located on the center main groove 21 side in the direction in which the groove width of the second lug groove 45 increases. Thus, groove walls 54 of the circumferential narrow groove 50 are offset from one another in the length direction at or near an opening portion 51 of the circumferential narrow groove 50 to the second lug groove 45, and the opening portion 51 of the circumferential narrow groove 50 opens to the second lug groove 45 with the groove walls 54 of the circumferential narrow groove 50 on either side in the groove width direction being offset from one another.

The offset amount of the edge 47 of the second lug groove 45 is preferably in the range of $0.6 \leq (WL1/WL2) \leq 0.9$, where WL1 is a groove width of the portion of the second lug groove 45 on the center main groove 21 side of the position where the circumferential narrow groove 50 is connected, and WL2 is a groove width of a portion of the second lug groove 45 on the second main groove 22 side.

When such a pneumatic tire 1 is mounted on a vehicle and the vehicle is driven, the pneumatic tire 1 rotates while the tread surface 3 of the tread surface 3 located at the bottom comes into contact with the road surface. When a vehicle mounted with the pneumatic tire 1 travels on a dry road surface, the vehicle is driven via driving forces and braking forces transferring to the road surface and turning forces being generated via the friction force between the tread surface 3 and the road surface. Additionally, when traveling on a wet road surface, the water between the tread surface 3 and the road surface enters the circumferential main grooves 20, the lug grooves 40, and the like and is drained via these grooves. Thus, the tread surface 3 can easily come into contact with the road surface, allowing the vehicle to be driven via the friction force between the tread surface 3 and the road surface.

Furthermore, when traveling on snow-covered road surfaces, the tread surface 3 of the pneumatic tire 1 compacts the snow on the road surface and the snow on the road surface enters the circumferential main grooves 20 and the lug grooves 40. Thus, snow also is compacted in the grooves. In this state, driving forces and braking forces and, when the vehicle turns, forces in the tire lateral direction act on the pneumatic tire 1, generating a shear force in snow, i.e., a shear force that acts on the snow inside the grooves. The shear force in snow produces resistance between the pneumatic tire 1 and the road surface, which allows the vehicle to be driven on snow-covered road surfaces with driving forces and braking forces being transferred to the snow-covered road surface.

Additionally, when traveling on snow-covered or icy road surfaces, the circumferential main grooves 20, the lug grooves 40, and the sipes 58 exhibit an edge effect. In other words, when traveling on snow-covered or icy road surfaces, the edge portions 30 of the circumferential main grooves 20 and the edges of the sipes 58 bite into the snowy or icy surface producing resistance. Furthermore, when traveling on icy road surfaces, water on the surface of the icy road surface is taken in by the sipes 58, and a water film between the icy road surface and the tread surface 3 is removed, allowing the icy road surface and the tread surface 3 to easily come into contact with one another. Thus, the resistance between the tread surface 3 and the icy road surface produced by the friction force and the edge effect is increased, allowing the running performance of the vehicle mounted with the pneumatic tire 1 to be ensured.

When traveling on snow-covered road surfaces, the shear force in snow is greatly displayed. Improving the shear force in snow is effective in improving performance on snow. To improve the shear force in snow, a region in which snow can be strongly compacted in the groove is ensured. Typically, a plurality of intersection points that open to grooves in four directions such as the four-direction intersection point 62 are provided. However, providing a tread pattern with only intersection points that open in four directions decreases the size of the land portions 10 and thus decreases block rigidity. This makes it difficult to ensure steering stability on snow and ice. On the other hand, to secure block rigidity, for example, a tread pattern may be provided with only intersection points that open in three directions by the end portions of the lug grooves 40 being connected to the circumferential main grooves 20. This ensures block rigidity, however, the amount of snow that can enter the intersection points is small. This makes it difficult to improve the shear force in snow.

Performance on snow relating to the driving forces and braking forces transferring on snow and the steering stability on snow and ice have conflicting preferred configurations in terms of groove intersection points. However, in the pneumatic tire 1 according to the present embodiment, the bent portion 35 is provided on the center main groove 21 and the second lug groove 45 is connected to the center main groove 21 at a position where the opening portion 46 to the center main groove 21 opposes the bent portion 35. Thus, the shear force in snow can be improved without reducing block rigidity. In other words, the bent portions 35 are formed where the position of the center main groove 21 in the tire lateral direction is offset in the tire lateral direction at a plurality of predetermined positions in the tire circumferential direction, and the second lug grooves 45 are connected to the center main grooves 21 with the opening portions 46 opening to the bent portions 35. This allows the groove area of the three-direction intersection points 61 to be increased and thus allow a larger amount of snow to enter the three-direction intersection points 61. As a result, the shear force in snow can be increased and performance on snow can be improved.

In addition, to increase the area into which snow can enter, by not increasing the number of grooves and instead forming the bent portions 35, the area into which snow can enter is increased. Thus, the center land portion 11 defined by the center side edge portions 31, i.e., the edge portions 30 of the center main grooves 21 on the side where the bent portions 35 are formed, can be prevented from decreasing in size. This can prevent a decrease in the block rigidity of the center land portion 11 and improve the steering stability on snow and ice. As a result, performance on snow and steering stability can be achieved in a compatible manner.

Furthermore, the bend angle θ of the bent portion 35 is in the range of 40°≤θ≤85°. Thus, the shear force in snow at the three-direction intersection point 61 can be ensured without a decrease in the block rigidity of the center land portion 11 around the bent portion 35. In other words, when the bend angle θ is less than 40°, the angle between the bent portion edge portion 36 and the outer center side edge portion 31a is too small. This may likely result in a decrease in the block rigidity of the center land portion 11 around the bent portion 35. When the bend angle θ is greater than 85°, the angle between the bent portion edge portion 36 and the outer center side edge portion 31a is too large. This may make it difficult to ensure the groove area of the three-direction intersection points 61 and ensure the shear force in snow. When the bend angle θ of the bent portion 35 is in the range of 40°≤θ≤85°, the shear force in snow at the three-direction intersection point 61 can be ensured and a decrease in the block rigidity around the bent portion 35 can be suppressed. As a result, performance on snow and steering stability can be more reliably achieved in a compatible manner.

The groove depth Ds of the center main groove 21 and the groove depth Dg of the second main groove 22 including the tread wear indicator 23 have a relationship within the range of 0.25Dg≤Ds≤Dg. Thus, the shear force in snow can be ensured without a decrease in block rigidity. In other words, when the relationship between the groove depth Ds of the center main groove 21 and the groove depth Dg of the second main groove 22 satisfies Ds<0.25Dg, the volume of the center main grooves 21 that include the three-direction intersection points 61 decreases and the amount of snow that enters the three-direction intersection points 61 and the center main grooves 21 decreases. This may make it difficult to ensure the shear force in snow. When the relation between the groove depth Ds of the center main groove 21 and the groove depth Dg of the second main groove 22 satisfies Ds>Dg, the groove depth Ds of the center main grooves 21 is too deep. As a result, the block rigidity of the center land portion 11 and the second land portions 12 may likely decrease. When the groove depth Ds of the center main groove 21 and the groove depth Dg of the second main groove 22 have a relationship within the range of 0.25Dg≤Ds≤Dg, the shear force in snow of the three-direction intersection points 61 and the center main grooves 21 can be ensured and a decrease in the block rigidity of the center land portion 11 and the second land portions 12 can be suppressed. As a result, performance on snow and steering stability can be more reliably achieved in a compatible manner.

The groove width W of the center main grooves 21 is within the range of 3 mm≤W≤10 mm Thus, the shear force in snow can be ensured without reducing block rigidity. In other words, when the groove width W of the center main grooves 21 is less than 3 mm, the groove width W is too narrow. Thus, the amount of snow that enters the center main grooves 21 decreases, making it difficult to ensure the shear force in snow. When the groove width W of the center main grooves 21 is greater than 10 mm, the groove width W is too wide. As a result, the block rigidity of the center land portion 11 and the second land portions 12 may likely decrease. When the groove width W of the center main grooves 21 is within the range of 3 mm≤W≤10 mm, the shear force in snow of the center main grooves 21 can be ensured and a decrease in the block rigidity of the center land portion 11 and the second land portions 12 can be suppressed. As a result, performance on snow and steering stability can be more reliably achieved in a compatible manner.

The three-direction intersection points 61 and the four-direction intersection points 62 are alternately disposed in the tire circumferential direction. Thus, the four-direction intersection points 62 can improve the shear force in snow, and a tread pattern can be formed with a good balance of block rigidity and shear force in snow. As a result, performance on snow and steering stability can be more reliably achieved in a compatible manner.

Additionally, the circumferential narrow groove 50 is formed in the second land portion 12. The circumferential narrow groove 50 more reliably ensures the shear force in snow. Furthermore, the circumferential narrow groove 50 includes the end portion 53 that terminates within the second land portion 12. This allows a decrease in block rigidity to be suppressed and the shear force in snow maintained. As a result, performance on snow and steering stability can be more reliably achieved in a compatible manner.

The circumferential narrow groove 50 has the length L in the tire circumferential direction ranging from 50% to 90% of the entire length LB of the second land portion 12 in the tire circumferential direction. This allows the shear force in snow to be ensured and a decrease in block rigidity to be suppressed. In other words, when the length L of the circumferential narrow groove 50 is less than 50% of the entire length LB of the second land portion 12, the length L of the circumferential narrow groove 50 to the second land portion 12 is too short. This may make it difficult for the circumferential narrow groove 50 to ensure the shear force in snow. When the length L of the circumferential narrow groove 50 is greater than 90% of the entire length LB of the second land portion 12, the length L of the circumferential narrow groove 50 to the second land portion 12 is too long. As a result, the block rigidity of the second land portion 12 may likely decrease. When the length L of the circumferential narrow groove 50 ranges from 50% to 90% of the entire length LB of the second land portion 12, the shear force in snow of the circumferential narrow groove 50 can be ensured and a decrease in the block rigidity of the second land portion 12 can be suppressed. As a result, performance on snow and steering stability can be more reliably achieved in a compatible manner.

The circumferential narrow groove 50 has a groove width that is wider at the end portion 52 on the side connected to the second lug groove 45 than at the end portion 53 on the side terminating within the second land portion 12. Thus, the shear force in snow of the portion of the circumferential narrow groove 50 on the side connected to the second land portion 12 can be ensured and a decrease in the block rigidity of the second land portion 12 can be suppressed. As a result, performance on snow and steering stability can be more reliably achieved in a compatible manner.

The edge 47 of the second lug groove 45 on the side where the circumferential narrow groove 50 is connected is offset in the groove width direction of the second lug groove 45 at either side in the tire lateral direction of the position where the circumferential narrow groove 50 is connected. Thus, the edge effect at the second lug grooves 45 and the circumferential narrow grooves 50 can be increased. In other words, the edge 47 of the second lug groove 45 is offset in the groove width direction of the second lug groove 45. Thus, the ground contact position of the edge 47 in the tire circumferential direction is different on either side of the position where the circumferential narrow groove 50 is connected to the second lug groove 45. This allows the edge effect in the tire circumferential direction to be increased. By the edge 47 of the second lug groove 45 being offset, one of the groove walls 54 on either side of the circumferential narrow groove 50 is easily exposed in the tire width direction. This allows the edge effect at the wall surface of the circumferential narrow groove 50 on the exposed side to be increased, and the edge effect in the tire width direction to be enhanced. As a result, steering stability can be more reliably improved.

Note that in the pneumatic tire 1 according to the embodiment described above, the bent portions 35 of the center main grooves 21 are provided on either side of the tire equator line CL in the tire lateral direction. That is, the three-direction intersection points 61 are provided on either side of the tire equator line CL in the tire lateral direction. However, the three-direction intersection point 61 may be provided on only one side in the tire lateral direction. In other words, relative to a vehicle mounted with the pneumatic tire 1, the three-direction intersection points 61 each including the bent portion 35 may be provided only on a vehicle mounting direction inner side of the tire equator line CL or may only be provided on a vehicle mounting direction outer side of the tire equator line CL.

Additionally, in the pneumatic tire 1 according to the embodiment described above, the bent portion 35 is provided on the center side edge portion 31, which is the edge portion 30 of the center main groove 21 located inwards in the tire lateral direction. However, the bent portion 35 may be provided on the edge portion 30 located outwards in the tire lateral direction. In a configuration in which the bent portion 35 is provided on the edge portion 30 of the center main groove 21 located outwards in the tire lateral direction, the center land portion 11 corresponds to the second land portion, the center lug grooves 41 correspond to the second land portion lug grooves, the center lug groove 41 is connected to the edge portion 30 on the opposite side to the edge portion 30 on the side of the center main groove 21 where the bent portion 35 is provided, and the opening portion is formed opposing the bent portion 35. This allows a decrease in block rigidity to be suppressed and the shear force in snow to be ensured.

In the pneumatic tire 1 according to the embodiment described above, the bent portion 35 is provided in the center main groove 21. However, the first main groove including the bent portion 35 may be a component other than the center main groove 21. The first main groove provided with the bent portion 35 is only required to be a circumferential main groove extending in the tire circumferential direction, and there are no limitations on its relative positional relationship with other circumferential main grooves.

In the pneumatic tire 1 according to the embodiment described above, the three-direction intersection points 61 and the four-direction intersection points 62 are alternately disposed in the tire circumferential direction. However, the three-direction intersection points 61 and the four-direction intersection points 62 may not be alternately disposed. A plurality of three-direction intersection points 61 may be disposed between two four-direction intersection points 62 or alternatively a plurality of four-direction intersection points 62 may be disposed between two three-direction intersection points 61. The three-direction intersection points 61 and the four-direction intersection points 62 are preferably appropriately arranged depending on the performance on snow and steering stability required for the pneumatic tire 1.

Additionally, in the pneumatic tire 1 according to the embodiment described above, the end portions of the circumferential narrow grooves 50 on the side connected to the second lug groove 45 are all connected on the same side in the tire circumferential direction. However, the end portion of the circumferential narrow groove 50 that is connected to the second lug groove 45 may vary per circumferential narrow groove 50.

Furthermore, the edge 47 on the side where the circumferential narrow groove 50 is connected to the second lug groove 45 includes a portion located on the second main groove 22 side and a portion located on the center main groove 21 side relative to the position where the circumferential narrow groove 50 is connected in the tire lateral direction. The portion located on the second main groove 22 side is offset from the portion located on the center main groove 21 side in the direction in which the groove width of the second lug groove 45 increases. However, the way the edge 47 is offset may be reversed. That is, the edge 47 on the side where the circumferential narrow groove 50 is connected to the second lug groove 45 includes a portion located on the second main groove 22 side and a portion located on the center main groove 21 side relative to the position where the circumferential narrow groove 50 is connected in the tire lateral direction, and the portion located on the center main groove 21 side may be offset in the direction in which the groove width of the second lug groove 45 increases. Regardless of the relative manner of the offset of the edge 47, it is only required that the positions of the edge 47 in the groove width direction of the second lug groove 45 on either side in the tire lateral direction of the portion where the circumferential narrow groove 50 is connected are offset from one another.

EXAMPLES

Figure 7A:
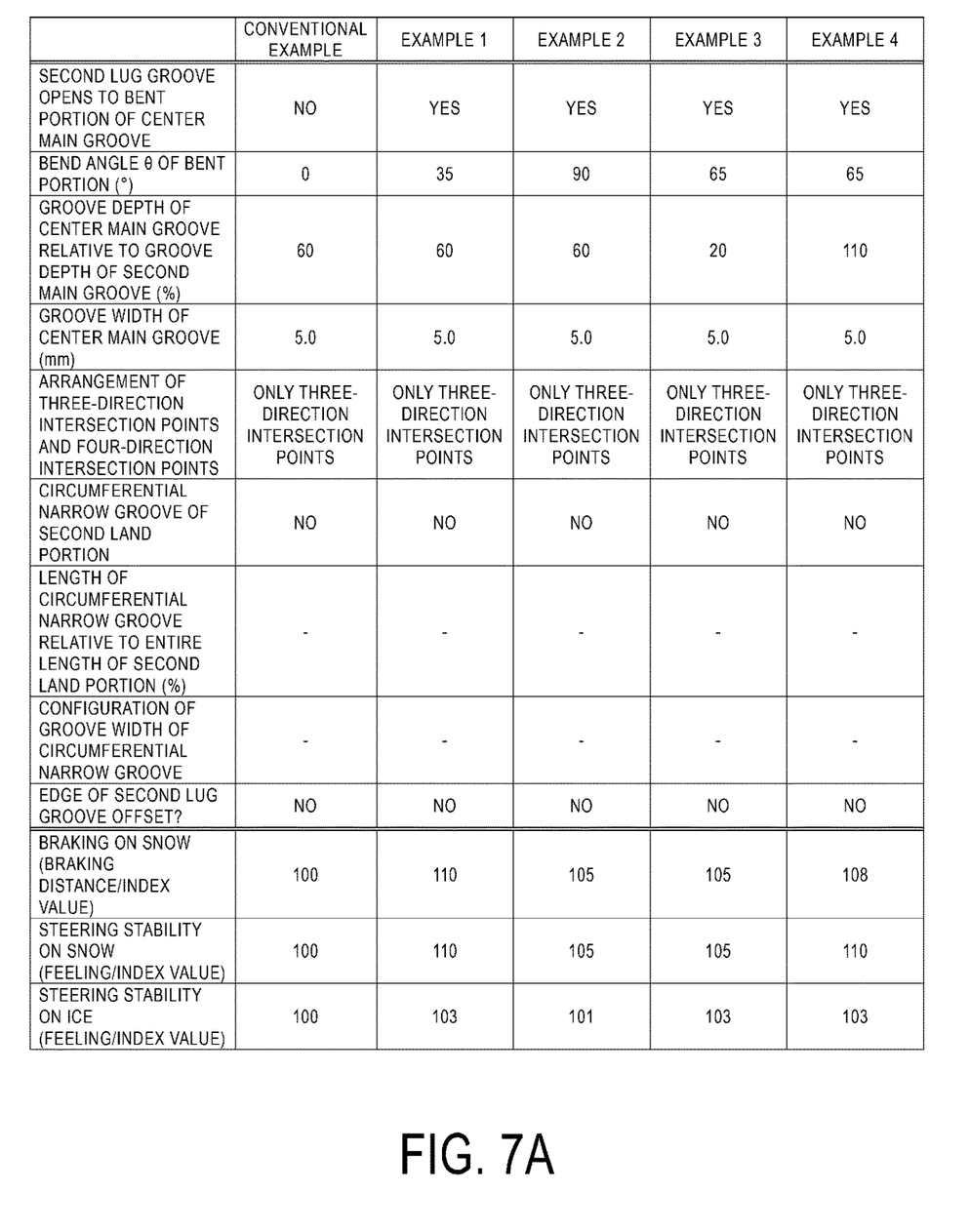
FIG. 7A is a table showing the results of performance tests of pneumatic tires.
Figure 7B:
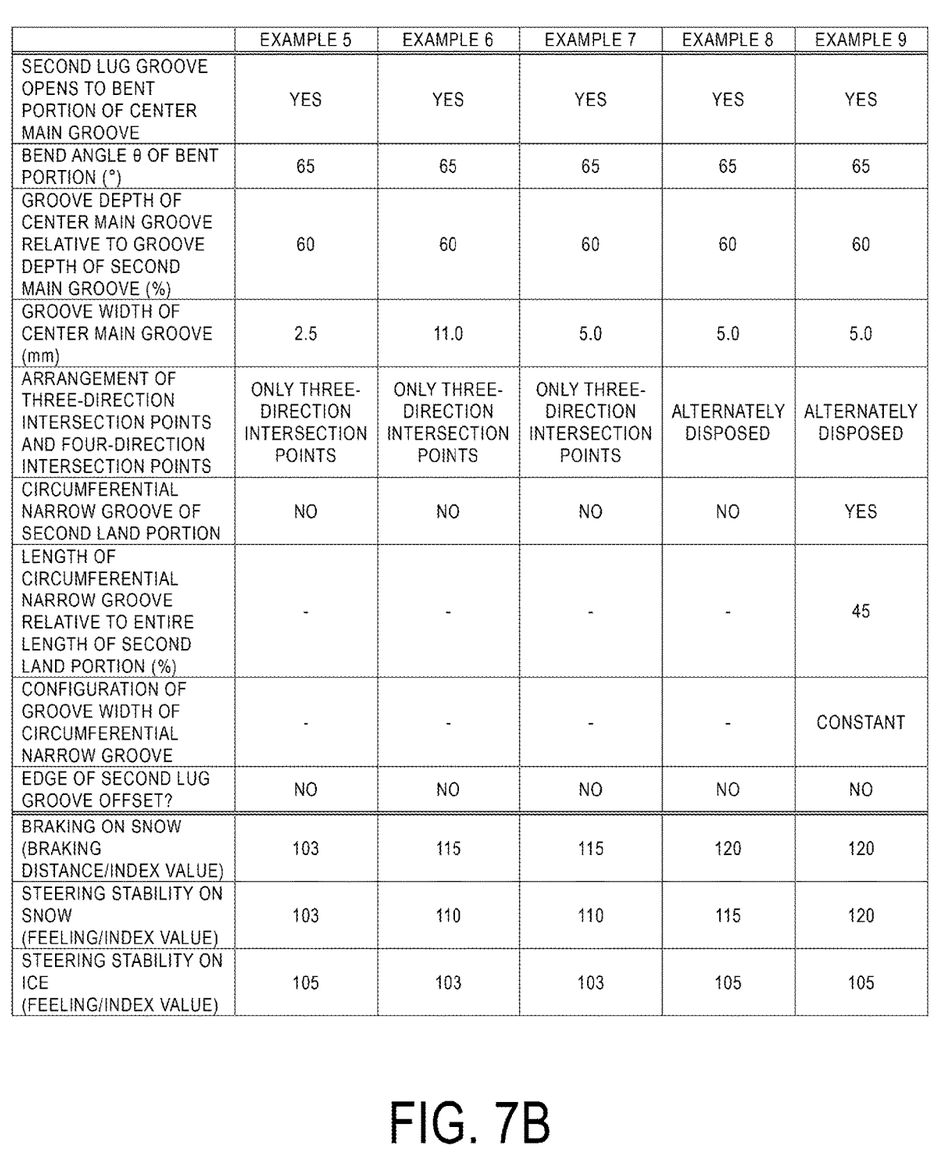
FIG. 7B is a table showing the results of performance tests of pneumatic tires.
Figure 7C:
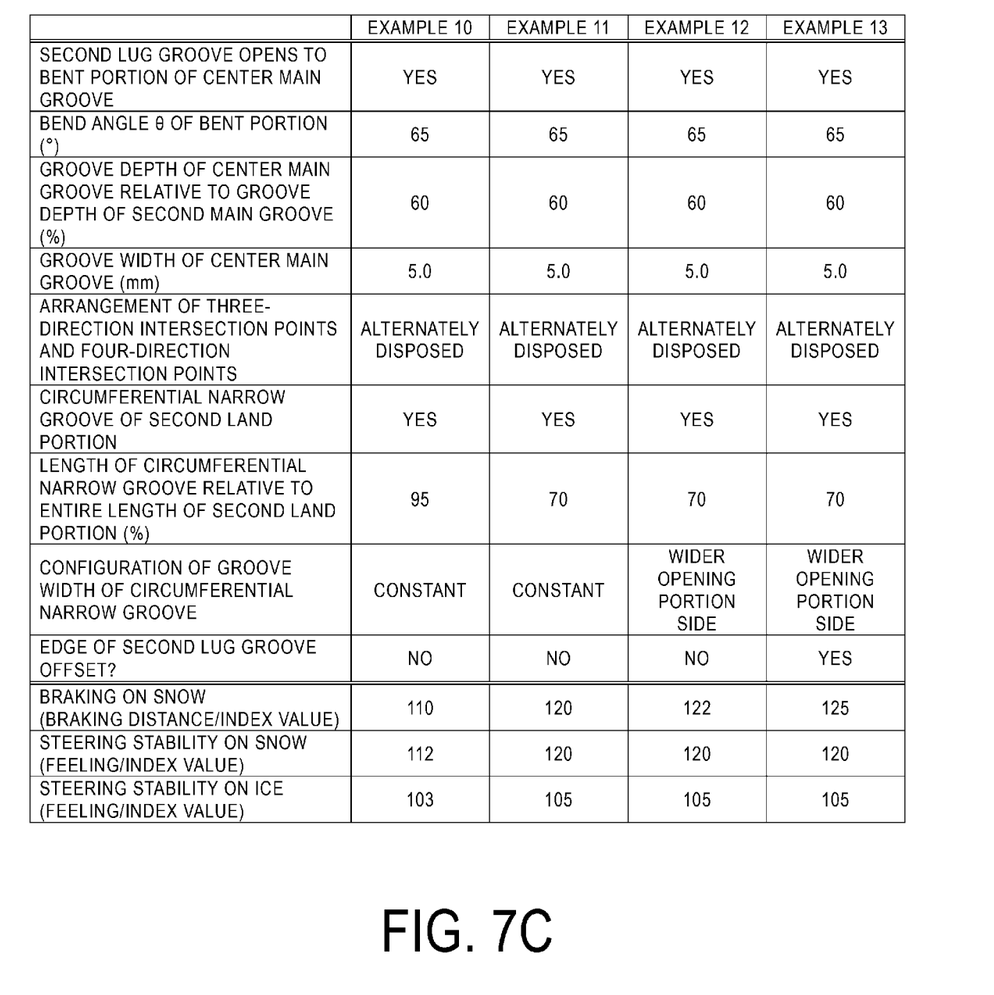
FIG. 7C is a table showing the results of performance tests of pneumatic tires.

FIGS. 7A to 7C are tables showing the results of performance tests of pneumatic tires. In relation to the pneumatic tire 1 described above, performance evaluation tests conducted on a pneumatic tire of a Conventional Example and pneumatic tires 1 according to embodiments of the present technology will be described below. Performance evaluation tests were performed for braking on snow, which represents performance on snow, steering stability on snow, and steering stability on ice.

In the performance evaluation tests, the pneumatic tires 1 having a JATMA-specified nominal size of 195/65R15 91Q were mounted on the rim wheels of JATMA standard rims having a size of 15×6.0 J, the air pressure was adjusted to 210 kPa, and the tires were mounted on a test vehicle used for the test runs. The evaluation methods for the test items are as follows. For braking on snow, a braking test was conducted by a test driver on a test course with a snow-covered road surface. The reciprocal of the braking distances was expressed as index values and evaluated with the Conventional Example described below being assigned the nominal value of 100. Larger values indicate shorter braking distance and superior braking on snow. For steering stability on snow, a sensory evaluation was conducted by a test driver driving the test vehicle on a test course with a snow-covered road surface. The sensory evaluation scores were expressed as index values and evaluated with the Conventional Example described below being assigned the nominal value of 100. Larger values indicate superior steering stability on snow. For steering stability on ice, a sensory evaluation was conducted by a test driver driving the test vehicle on a test course with an ice-covered road surface. The sensory evaluation scores were expressed as index values and evaluated with the Conventional Example described below being assigned the nominal value of 100. Larger values indicate superior steering stability on ice.

The evaluation tests were conducted on a pneumatic tire of a Conventional Example, which is an example of a conventional pneumatic tire 1, and pneumatic tires 1 of Examples 1 to 13, which are embodiments of the present technology. Of these pneumatic tires 1, the pneumatic tire of the Conventional Example is not provided with the bent portion 35 in the center main groove 21, and thus the second lug groove 45 does not open to the bent portion 35.

In Examples 1 to 13, which are pneumatic tires 1 according to embodiments of the present technology, the opening portion 46 of the second lug groove 45 is disposed opposing the bent portion 35 of the center main groove 21. Additionally, the bend angle θ of the bent portion 35, the groove depth Ds of the center main groove 21 relative to the groove depth Dg of the second main groove 22, the groove width W of the center main groove 21, the arrangement of the three-direction intersection points 61 and the four-direction intersection points 62, whether the circumferential narrow groove 50 of the second land portion 12 is provided, the length L of the circumferential narrow groove 50 relative to the entire length LB of the second land portion 12, the configuration of the groove width of the circumferential narrow groove 50, and whether the edge 47 of the second lug groove 45 is offset vary in the pneumatic tires 1 according to Examples 1 to 13.

As seen from the results of the evaluation tests for the pneumatic tires 1, as indicated in FIGS. 7A to 7C, the pneumatic tires 1 of Examples 1 to 13 all have better braking on snow, steering stability on snow, and steering stability on ice than the pneumatic tire of the Conventional Example. In other words, the pneumatic tires 1 of Examples 1 to 13 can achieve performance on snow and steering stability in a compatible manner.

The invention claimed is:
1. A pneumatic tire, comprising:
a first main groove extending in a tire circumferential direction;
a first land portion defined by the first main groove and further defined by a plurality of first land portion through lug grooves extending entirely through the first land portion;
a second land portion located adjacent to the first land portion across the first main groove; and
a plurality of second land portion lug grooves extending from the first main groove toward the second land portion in a tire lateral direction and defining the second land portion together with the first main groove;
the first main groove comprising a first land portion side edge portion corresponding to an edge portion on the first land portion side, the first land portion side edge portion comprising a bent portion formed bent in a direction outwards in a groove width direction of the first main groove with an acute bend angle θ, and the bent portion being formed between adjacent first land portion through lug grooves in the tire circumferential direction; and
a subset of the second land portion lug grooves comprising an opening portion to the first main groove connected to the first main groove at a position opposing the bent portion; wherein
an interval in the tire circumferential direction between adjacent of the first land portion through lug grooves is greater than an interval in the tire circumferential direction between adjacent of the second land portion lug grooves, and
the second land portion is provided with a circumferential narrow groove extending in the tire circumferential direction, the circumferential narrow groove comprising an end connected to the second land portion lug grooves and an end terminating within the second land portion.
2. A pneumatic tire, comprising:
a first main groove extending in a tire circumferential direction;
a first land portion defined by the first main groove and further defined by a plurality of first land portion through lug grooves extending entirely through the first land portion;
a second land portion located adjacent to the first land portion across the first main groove; and
a plurality of second land portion lug grooves extending from the first main groove toward the second land portion in a tire lateral direction and defining the second land portion together with the first main groove;
the first main groove comprising a first land portion side edge portion corresponding to an edge portion on the first land portion side, the first land portion side edge portion comprising a bent portion formed bent in a direction outwards in a groove width direction of the first main groove with an acute bend angle θ, and the bent portion being formed between adjacent first land portion through lug grooves in the tire circumferential direction; and a subset of the second land portion lug grooves comprising an opening portion to the first main groove connected to the first main groove at a position opposing the bent portion; wherein an interval in the tire circumferential direction between adjacent of the first land portion through lug grooves is greater than an interval in the tire circumferential direction between adjacent of the second land portion lug grooves;

the first land portion lug grooves are connected to the first main groove and extend inwards from the first main groove in the tire lateral direction;

a second subset of the plurality of second land portion lug grooves comprises an opening portion to the first main groove connected at a position that at least partially overlaps in the tire circumferential direction with an opening portion of the first land portion lug grooves to the first main groove;

the plurality of second land portion lug grooves are connected to the first main groove at a plurality of intersection points; and the plurality of intersection points comprise a three-direction intersection point where the bent portion is formed on the first land portion side edge portion side of the first main groove, and a four-direction intersection point where the first land portion lug grooves are connected to the first main groove on the first land portion edge portion side, the three-direction intersection point and the four-direction intersection point being alternately disposed in the tire circumferential direction.

3. The pneumatic tire according to claim 2, wherein a groove depth Ds of the first main groove and a groove depth Dg of a wear detection main groove extending in the tire circumferential direction and comprising a tread wear indicator have a relationship within a range of $0.25Dg \leq Ds \leq Dg$.

4. The pneumatic tire according to claim 2, wherein a groove width W of the first main groove is within a range of $3\ mm \leq W \leq 10\ mm$.

5. The pneumatic tire according to claim 2, wherein the first main groove extends inclined relative to the tire circumferential direction.

6. The pneumatic tire according to claim 2, wherein the first main groove forms a zigzag shape in the tire circumferential direction.

7. The pneumatic tire according to claim 2, wherein the second land portion is provided with a circumferential narrow groove extending in the tire circumferential direction, the circumferential narrow groove comprising an end connected to the second land portion lug grooves and an end terminating within the second land portion.

8. The pneumatic tire according to claim 7, wherein the circumferential narrow groove has a length in the tire circumferential direction ranging from 50% to 90% of an entire length of the second land portion in the tire circumferential direction.

9. The pneumatic tire according to claim 7, wherein the circumferential narrow groove has a wider groove width at an end portion on a side connected to the second land portion lug grooves than at an end portion on a side where the circumferential narrow groove terminates within the second land portion.

10. The pneumatic tire according to claim 7, wherein the second land portion lug grooves comprise an edge on a side where the circumferential narrow groove is connected, the edge is offset in a groove width direction of the second land portion lug grooves at either side in the tire lateral direction of a position where the circumferential narrow groove is connected.

11. The pneumatic tire according to claim 2, wherein the bend angle $\theta$ of the bent portion is within a range of $40° \leq \theta \leq 85°$.

12. The pneumatic tire according to claim 11, wherein a groove depth Ds of the first main groove and a groove depth Dg of a wear detection main groove extending in the tire circumferential direction and comprising a tread wear indicator have a relationship within a range of $0.25Dg \leq Ds \leq Dg$.

13. The pneumatic tire according to claim 12, wherein a groove width W of the first main groove is within a range of $3\ mm \leq W \leq 10\ mm$.

14. The pneumatic tire according to claim 13, wherein the second land portion is provided with a circumferential narrow groove extending in the tire circumferential direction, the circumferential narrow groove comprising an end connected to the second land portion lug grooves and an end terminating within the second land portion.

15. The pneumatic tire according to claim 14, wherein the circumferential narrow groove has a length in the tire circumferential direction ranging from 50% to 90% of an entire length of the second land portion in the tire circumferential direction.

16. The pneumatic tire according to claim 15, wherein the circumferential narrow groove has a wider groove width at an end portion on a side connected to the second land portion lug grooves than at an end portion on a side where the circumferential narrow groove terminates within the second land portion.

17. The pneumatic tire according to claim 16, wherein the second land portion lug grooves comprise an edge on a side where the circumferential narrow groove is connected, the edge is offset in a groove width direction of the second land portion lug grooves at either side in the tire lateral direction of a position where the circumferential narrow groove is connected.

* * * * *